US012560240B2

(12) United States Patent
Fesl et al.

(10) Patent No.: US 12,560,240 B2
(45) Date of Patent: Feb. 24, 2026

(54) MECHANICAL SEAL ASSEMBLY WITH IMPROVED SUPPORT OF AXIAL FORCES

(71) Applicant: EagleBurgmann Germany GmbH & Co. KG, Wolfratshausen (DE)

(72) Inventors: Andreas Fesl, Otterfing (DE); Stephan Rankl, Gilching (DE); Florian Bauer, Wackersberg (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 102 days.

(21) Appl. No.: 18/690,930

(22) PCT Filed: Aug. 2, 2022

(86) PCT No.: PCT/EP2022/071652
§ 371 (c)(1),
(2) Date: Mar. 11, 2024

(87) PCT Pub. No.: WO2023/041242
PCT Pub. Date: Mar. 23, 2023

(65) Prior Publication Data
US 2024/0376985 A1 Nov. 14, 2024

(30) Foreign Application Priority Data
Sep. 17, 2021 (DE) .................... 10 2021 124 115.4

(51) Int. Cl.
*F16J 15/34* (2006.01)
(52) U.S. Cl.
CPC ................................. *F16J 15/3488* (2013.01)
(58) Field of Classification Search
CPC ................................................... F16J 15/3488
See application file for complete search history.

(56) References Cited

U.S. PATENT DOCUMENTS 3,655,206 A * 4/1972 Adams ..................... F16J 15/22
277/396
3,773,337 A * 11/1973 Adams ................... F16J 15/363
277/392

(Continued)

FOREIGN PATENT DOCUMENTS

| CN | 105593583 A | * | 5/2016 | ........... F16J 15/3488 |
| EP | 3450805 A1 | | 3/2019 | |
| WO | 2011/009596 A1 | | 1/2011 | |

*Primary Examiner* — Vishal A Patel
(74) *Attorney, Agent, or Firm* — Troutman Pepper Locke LLP; Scott D. Wofsy

(57) ABSTRACT

The invention relates to a mechanical seal assembly (1) for sealing between a high-pressure region (8) and a low-pressure region (9) on a rotating component (7), comprising a mechanical seal (2) with a rotating slide ring (3) with a first slide surface (30) and a stationary slide ring (4) with a second slide surface (40), wherein a sealing gap (5) is defined between the slide surfaces (30, 40), a slide ring carrier (31) for the rotating slide ring (3), which is configured to connect the rotating slide ring (3) to the rotating component (7) in a rotationally fixed manner, wherein the slide ring carrier (31) comprises a sleeve region (32), and a force support arrangement (6), which is configured to support an axial force (F) acting on the mechanical seal assembly (1), wherein the force support arrangement (6) is arranged on an end face (32a) of the sleeve region (32) of the slide ring carrier (31), wherein the force support arrangement (6) comprises a clamping sleeve (60), a conical sleeve (61) and a split ring (62) with at least two segments (621, 622), wherein a conical connection with a first conical surface (60a) on the clamping sleeve (60) and a second conical surface (61a) on the conical sleeve (61) is formed between the clamping sleeve (60) and the conical sleeve (61), and wherein the clamping sleeve (60) bears against the end face (32a) of the sleeve region (32) and the conical
(Continued)

Figure 1:
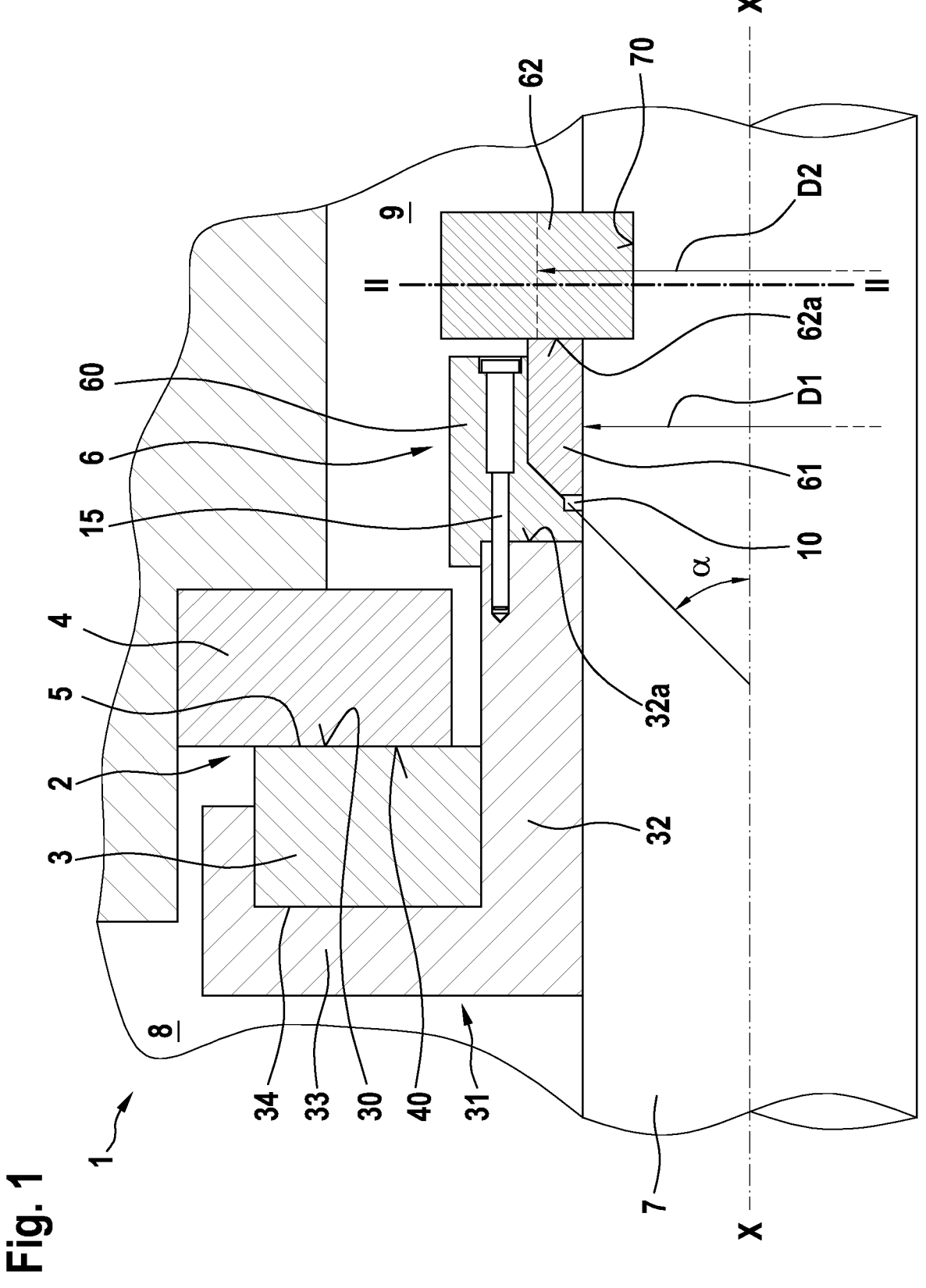

sleeve (61) bears against a side surface (62*a*) of the divided ring (62).

9 Claims, 3 Drawing Sheets

(56)                      References Cited

U.S. PATENT DOCUMENTS

| 4,174,844 | A | * | 11/1979 | Zobens | .................. | F16J 15/162 |
| | | | | | | 277/390 |
| 4,349,205 | A | * | 9/1982 | McGee | .................. | F16J 15/166 |
| | | | | | | 277/584 |
| 4,575,100 | A | * | 3/1986 | Hay, II | .................... | F16J 15/40 |
| | | | | | | 277/411 |
| 4,973,065 | A | * | 11/1990 | Habich | ................ | F16J 15/3468 |
| | | | | | | 277/399 |
| 4,997,191 | A | | 3/1991 | Warner | | |
| 7,029,012 | B2 | * | 4/2006 | Roddis | .................... | F16J 15/38 |
| | | | | | | 277/390 |

* cited by examiner

1

MECHANICAL SEAL ASSEMBLY WITH IMPROVED SUPPORT OF AXIAL FORCES

CROSS-REFERENCE TO RELATED APPLICATIONS

This application is a U.S. National Phase Application filed under 35 U.S.C. § 371, based on International Patent Application No. PCT/EP2022/071652, filed Aug. 2, 2022, which claims priority to German Patent Application No. 10 2021 124 115.4, filed on Sep. 17, 2021, which are incorporated herein by reference.

DESCRIPTION

The present invention relates to a mechanical seal assembly for sealing between a high-pressure region and a low-pressure region on a shaft with improved support of axial forces that may act on the mechanical seal assembly during operation.

Mechanical seal assemblies are known from the prior art in various configurations. In particular in the case of gas seals, very high axial forces may act on the components of the mechanical seal assembly in high-pressure applications with pressures of more than $200 \times 10^5$ Pa. To absorb these high forces, it is known to use a so-called split ring, which is composed of several circumferential segments, to transmit the axial force to a shaft or the like. Deformations on this split ring may cause circumferential waviness, which in extreme cases can press-through to the slide surfaces of the slide rings due to elastic deformation. However, waviness on the slide surfaces must be avoided at all costs in order not to unnecessarily limit the performance of the mechanical seal. In the prior art, elastic secondary sealing elements are used between the split ring and the mechanical seal to reduce the waviness that may be transferred from the split ring to the slide surfaces. These can be elastically deformed when axial forces occur and thus reduce the risk of undesirable waviness being transferred to the slide surfaces of the mechanical seal. In high-pressure applications and also in sealing tasks where the medium to be sealed has high temperatures, elastic secondary sealing elements cannot be used or can only be used to a limited extent.

It is therefore the object of the present invention to provide a mechanical seal assembly which can prevent the transmission of waviness from a split ring to the slide surfaces of the mechanical seal assembly with a simple structure and simple, low-cost manufacturability and which is also suitable in particular for high-pressure applications and high-temperature applications.

This object is achieved by means of a mechanical seal assembly having the features of claim 1. The dependent claims specify preferred embodiments of the invention.

In contrast, the mechanical seal assembly according to the invention having the features of claim 1 provides the advantage that axial forces acting on the mechanical seal assembly can be absorbed significantly better and transmitted to a rotating component. In particular, waviness can be prevented from being impressed on the slide surfaces of the mechanical seal assembly when axial forces occur. According to the invention, this is achieved in that the mechanical seal assembly comprises a mechanical seal for sealing between a high-pressure region and a low-pressure region on a shaft or the like, which comprises a rotating slide ring with a first slide surface and a stationary slide ring with a second slide surface, wherein a sealing gap is defined between the slide surfaces of the slide rings. Furthermore, a slide ring carrier is provided for the rotating slide ring, which is configured for a rotationally fixed connection with the rotating component, in particular a shaft. The slide ring carrier comprises a sleeve region. Furthermore, the mechanical seal assembly comprises a force support arrangement, which is configured to support an axial force acting on the mechanical seal assembly. The force support arrangement is arranged on an end face of the sleeve region of the slide ring carrier. The force support arrangement comprises a clamping sleeve, a conical sleeve and a split ring with at least two segments. The split ring is divided into several circumferential segments in the radial direction of the mechanical seal assembly, which are connected to each other on a rotating component in the assembled state. Furthermore, a conical connection is formed between the clamping sleeve and the conical sleeve. The clamping sleeve bears against the end face of the sleeve region of the slide ring carrier and the conical sleeve bears against a side surface of the split ring.

Thus, when an axial force acting on the mechanical seal assembly occurs, a force is transmitted from the slide ring carrier to the clamping sleeve, from the clamping sleeve to the conical sleeve, from the conical sleeve to the split ring, and from the split ring to the rotating component. The axial force is thus transmitted via four connection surfaces, namely a first connection surface between the sleeve region and the clamping sleeve, a second connection surface at the conical connection between the clamping sleeve and the conical sleeve, a third connection surface between the conical sleeve and the split ring and a fourth connection surface between the split ring and the rotating component.

A particular advantage of the configuration according to the invention is that by using the conical connection between the clamping sleeve and the conical sleeve, a component of the axial force in the radial direction can be transmitted directly to the rotating component via an inner circumference of the conical sleeve. This significantly reduces the axial force that ultimately remains on the fourth connection surface for transmission to the rotating component. This prevents the separation points of the split ring from being impressed onto the slide surfaces of the mechanical seal assembly.

In order to achieve the most compact configuration possible and to ensure reliable force transmission from the clamping sleeve to the conical sleeve, the clamping sleeve preferably comprises a receiving space to accommodate the conical sleeve. The conical sleeve can preferably be arranged in the receiving space of the clamping sleeve to a large extent, in particular by more than 80% of its extent in the axial direction.

Preferably, the receiving space of the clamping sleeve comprises a first inner-side conical surface and the conical sleeve comprises a second outer-side conical surface. The two conical surfaces form the conical connection between the clamping sleeve and the conical sleeve.

The conical connection is preferably arranged at an angle $\alpha$ of $35°\pm8°$, in particular $35°\pm3°$, to a central axis X-X of the mechanical seal. Depending on the selection of angle $\alpha<45°$, a greater force of a radial force transmission via the conical sleeve into the rotating component can be achieved than axial force transmission in the direction of the split ring.

It is particularly preferable for the average diameter of the split ring to be larger than the inner diameter of the conical sleeve. This results in a favorable application of force from the conical sleeve to the split ring. In particular, inherent deformation of the split ring is reduced in this contact area of the split ring.

The clamping sleeve, the split ring, the slide ring carrier and the conical sleeve are particularly preferably made of metal material, in particular of the same metal material. Steel is preferably used as the metal material. This means that the mechanical seal assembly can be used in particular in high-temperature applications, in which the use of elastic sealing elements is not possible due to the destruction of elastic sealing elements caused by the high temperatures, as well as in high-pressure applications, in which there is a high probability that waviness will be imprinted onto the slide surfaces of the slide rings when split rings are used. When using different materials for the clamping sleeve, the split ring, the slide ring carrier and the conical sleeve, the different materials preferably have the same or very similar ($\pm 10\%$) coefficient of thermal expansion.

The split ring is particularly preferably arranged in a groove in the rotating component, in particular in a groove in a shaft.

An axial gap is also preferably provided on the inner circumferential region between the clamping sleeve and the conical sleeve. This provides the force support arrangement with at least certain damping properties when an axial force is introduced. The axial force can thus be reliably transmitted from the sleeve region of the slide ring carrier to the rotating component via the force transmission path.

In order to further improve the transmission of the axial force, a screw connection is preferably formed between the sleeve region of the slide ring carrier and the clamping sleeve. The screw connection preferably comprises a large number of screw bolts arranged along the circumference, which are guided through the clamping sleeve and screwed into the end face of the sleeve region.

The mechanical seal assembly is also preferably a gas seal for sealing a gaseous medium. The gaseous medium is particularly preferably under high pressure, preferably more than $200 \times 10^5$ Pa, and high temperature, in particular more than 400° C.

Figure 2:
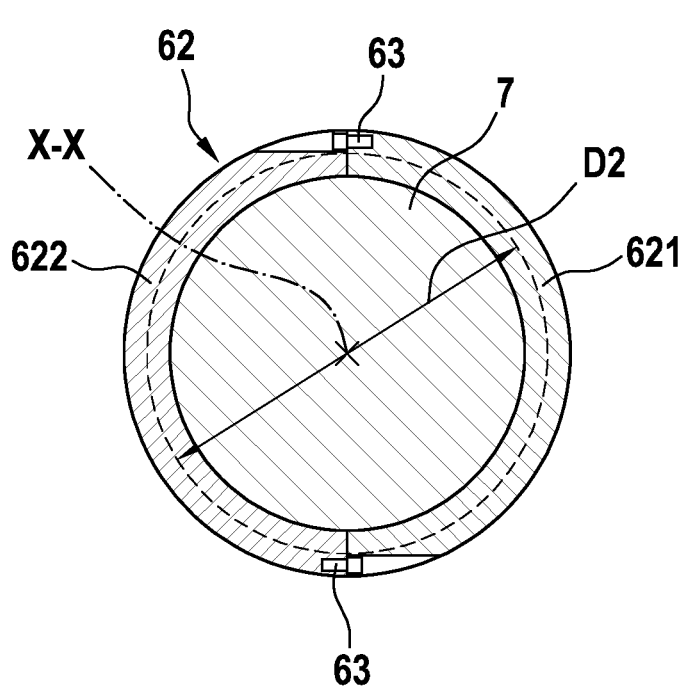
Figure 3:
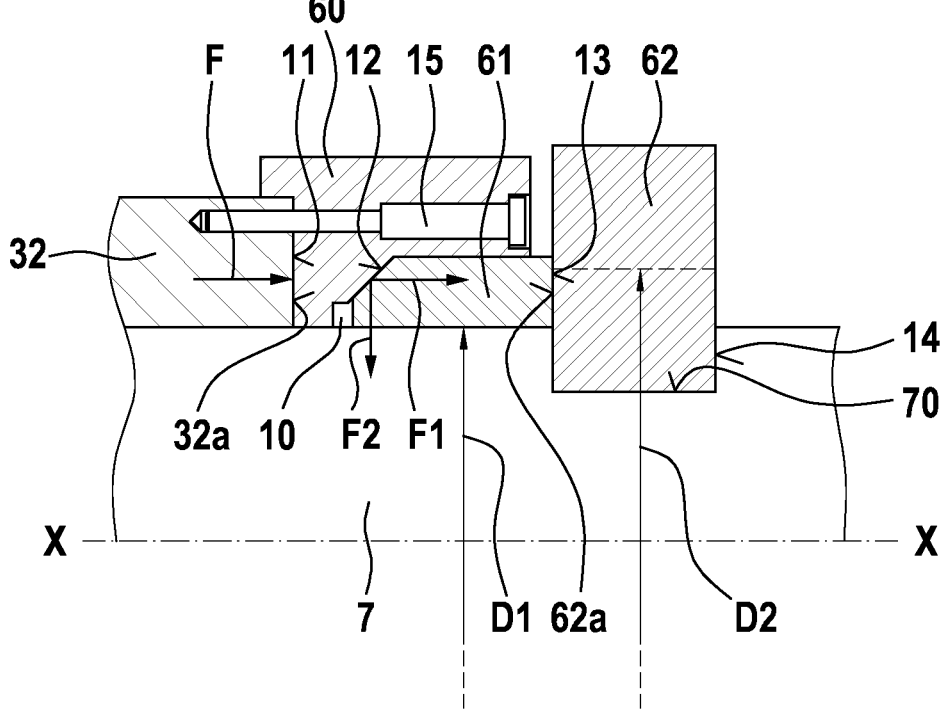
Figure 5:
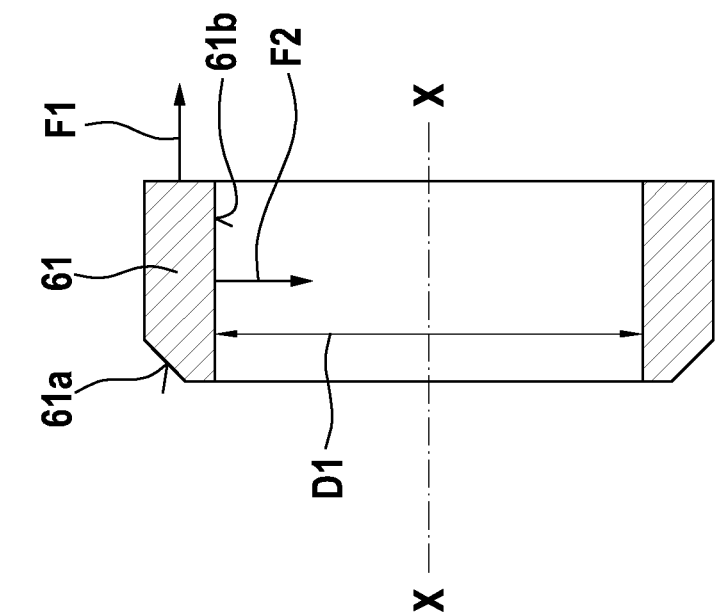
Figure 4:
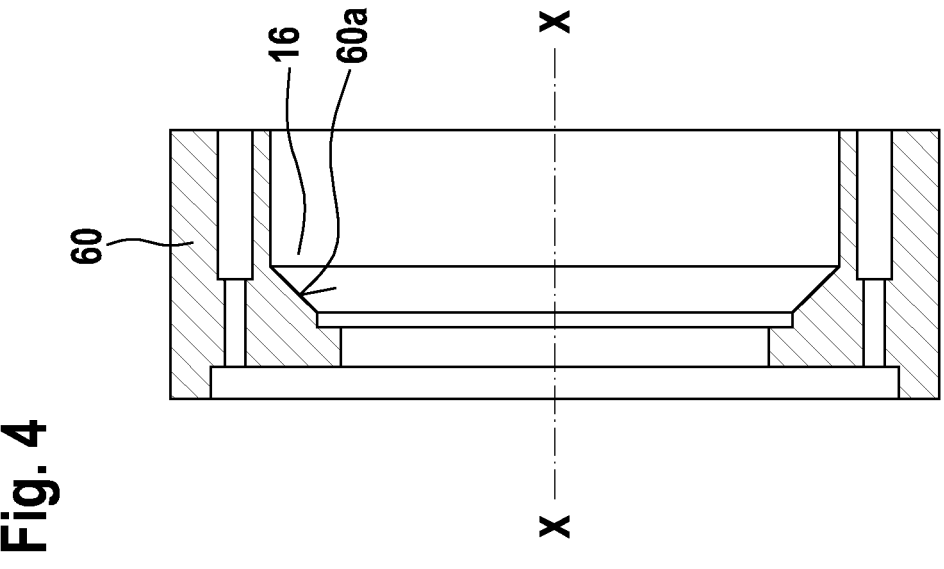

An embodiment of the invention is described in detail below with reference to the accompanying drawing. The drawings show in:

FIG. 1 a schematic sectional view of a mechanical seal assembly according to a preferred embodiment of the invention, FIG. 2 a schematic sectional view along line II-II of FIG. 1, FIG. 3 a schematic, enlarged partial sectional view of the mechanical seal assembly of FIG. 1, FIG. 4 schematic sectional view of a clamping sleeve of the mechanical seal assembly of FIG. 1, and FIG. 5 schematic sectional view of a conical sleeve of the mechanical seal assembly of FIG. 1.

A mechanical seal assembly 1 according to a preferred exemplary embodiment of the invention will be described in detail below with reference to FIGS. 1 to 5.

As can be seen from FIG. 1, the mechanical seal assembly 1 comprises a mechanical seal 2 with a rotating slide ring 3 and a stationary slide ring 4. The rotating slide ring 3 comprises a first slide surface 30 and the stationary slide ring 4 comprises a second slide surface 40. A sealing gap 5 is defined between the two slide surfaces 30, 40 of the slide rings 3, 4.

As can also be seen from FIG. 1, the mechanical seal assembly 1 seals a high-pressure region 8 from a low-pressure region 9 on a shaft 7. In the high-pressure region 8, a gas under high pressure, in particular more than $200 \times 10^5$ Pa, is preferably present as the medium to be sealed.

The rotating slide ring 3 is connected to the shaft 7 by means of a slide ring carrier 31 in a co-rotational manner. The slide ring carrier 31 comprises a sleeve region 32 arranged on the shaft 7 and a holding region 33, which partially encloses the rotating slide ring 3. Thus, when the shaft 7 is rotating, force is transmitted from the shaft 7 to the slide ring carrier 31 and from this to the rotating seal ring 3.

A metallic seal 34 without an elastic secondary seal is also preferably formed between the slide ring carrier 31 and the rotating slide ring 3. This means that no elastic secondary sealing element has to be provided between the slide ring carrier 31 and the rotating slide ring 3 to seal the gap between these two components, so that both a high-pressure application and a high-temperature application are possible without any problems.

The mechanical seal assembly 1 further comprises a force support arrangement 6. The force support arrangement 6 can be seen in detail in FIG. 3. The force support arrangement 6 comprises a clamping sleeve 60, a conical sleeve 61 and a split ring 62.

The split ring 62 is a ring divided into two circumferential segments, wherein in this exemplary embodiment, the split ring 62 comprises a first segment 621 and a second segment 622. The two segments are connected to each other via screw connections 63 (see FIG. 2). Alternatively, the split rings are held by means of a sleeve pushed over them.

The split ring 62 is arranged in a groove 70 in the shaft 7.

The clamping sleeve 60 can be seen in detail in FIG. 4. In particular, the clamping sleeve 60 comprises a first conical surface 60a and a receiving space 16. Just like the first conical surface 60a, the receiving space 16 is formed on a radial inner side, i.e. a side of the clamping sleeve 60 facing the shaft 7. The receiving space 16 serves to receive the conical sleeve 61, as can be seen in FIGS. 1 and 3.

The conical sleeve 61 can be seen in detail in FIG. 5. The conical sleeve 61 comprises a second conical surface 61a. Furthermore, the conical sleeve 61 comprises an inner circumference 61b, with which the conical sleeve 61 is arranged on the shaft 7.

The force support arrangement 6 is configured to support an axial force F acting on the mechanical seal assembly 1. Such axial forces F can occur during operation of the mechanical seal assembly, in particular depending on a load on a machine to be sealed, and in particular in the event of load changes.

As can also be seen from FIGS. 1 and 3, a conical connection is formed between the clamping sleeve 60 and the conical sleeve 61, which is provided by the first conical surface 60a of the clamping sleeve 60 and the second conical surface 61a of the conical sleeve 61. The conical sleeve 61 is accommodated in the receiving space 16 of the clamping sleeve 60.

As can also be seen from FIGS. 1 and 3, the clamping sleeve 60 bears against an end face 32a of the sleeve region 32 of the slide ring carrier 31 in the assembled state. Furthermore, the conical sleeve 61 bears against a side surface 62a of the split ring 62.

Furthermore, the conical sleeve 61 has an inner diameter D1 that is smaller than an average diameter D2 of the split ring 62 (see FIG. 1). This ensures a force transmission into a radially inner region of the split ring 62, whereby the transmission of the axial force from the split ring 62 to the shaft 7 is achieved without a large leverage effect.

The conical connection between the clamping sleeve 60 and the conical sleeve 61 has an angle $\alpha$ to a central axis X-X of the mechanical seal assembly 1 (see FIG. 1). The angle $\alpha$ is preferably in a range of 35°±3°.

The clamping sleeve 60 is connected to the sleeve region 32 of the slide ring carrier 31 by means of a bolt 15. Preferably, several bolts 15 are arranged at the same distance from one another along the circumferential direction of the clamping sleeve.

The slide ring carrier 31, the clamping sleeve 60, conical sleeve 61 and the split ring 62 are all made of a steel material, preferably the same steel material. This ensures that the mechanical seal assembly 1 can be used for high-pressure applications as well as for high-temperature applications.

As can also be seen from FIG. 3, four connection surfaces are thus provided between the slide ring carrier 31 and the shaft 7 for transmitting the axial force F. A first connection surface 11 is formed between the sleeve region 32 and the clamping sleeve 60. A second connection surface 12, which creates the conical connection, is formed between the clamping sleeve 60 and the conical sleeve 61. A third connection surface 13 is formed between the conical sleeve 61 and a side surface 62a of the split ring 62. A fourth connection surface 14 is formed between the split ring 62 and the shaft 7 in the area of the groove 70 (see FIG. 3).

Thus, if an axial force Facts on the mechanical seal assembly 1 during operation of the mechanical seal assembly 1, this force is transmitted via the slide ring carrier 31 to the force support arrangement 6, which is arranged on the shaft 7. By providing the conical second connection surface 12 between the clamping sleeve 60 and the conical sleeve 61, the force F is thus divided into an axial component F1 and a radial component F2. The radial component F2 is then transmitted directly to the shaft 7 via the inner circumference 61b of the conical sleeve 61. This significantly reduces the force remaining to be transmitted from the conical sleeve 61 to the split ring 62 and from this to the shaft 7 via the groove 70.

In this way, load-induced waviness in particular, which can occur due to deformation of the split ring 62 when the axial force F occurs, can be reduced to such an extent that this waviness is not imprinted on the slide surfaces 30, 40 of the slide rings.

Furthermore, there is an axial gap 10 between the clamping sleeve 60 and the conical sleeve 61 (see FIG. 3). The axial gap 10 provides a certain damping effect when axial forces F occur, which enables a certain inherent deformation of the components of the force support arrangement 6.

Since deformation of the steel used as material for the slide ring carrier 31, the clamping sleeve 60, the conical sleeve 61 and the split ring 62 is relatively low, an improved configuration of components of the mechanical seal assembly 1 can also be realized.

In particular, a maximum magnitude of the introduction of waviness caused by the split ring 62 onto the slide surfaces 30, 40 can be achieved by selecting the angle α of the conical connection between the clamping sleeve 60 and the conical sleeve 61.

LIST OF REFERENCE NUMERALS

1 mechanical seal assembly
2 mechanical seal
3 rotating slide ring
4 stationary mechanical seal
5 sealing gap
6 force support arrangement
7 shaft/rotating component
8 high-pressure region
9 low-pressure region

10 axial gap
11 first connection surface
12 second connection surface
13 third connection surface
14 fourth connection surface
15 bolt
16 receiving space
30 first slide surface
31 slide ring carrier
32 sleeve region
32a end face of the sleeve region
33 holding region
34 metallic seal
40 second slide surface
60 clamping sleeve
60a first conical surface
61 conical sleeve
61a second conical surface
61b inner circumference
62 split ring
62a side surface of the split ring
63 screw connection
621 first segment
622 second segment
70 groove
D1 inner diameter of the conical sleeve
D2 average diameter of the split ring
F axial force
F1 axial force component of the axial force
F2 radial force component of the axial force
X-X central axis
α angle

The invention claimed is:

1. Mechanical seal assembly for sealing between a high-pressure region and a low-pressure region on a rotating component, comprising: a mechanical seal with a rotating slide ring with a first slide surface and a stationary slide ring with a second slide surface, wherein a sealing gap is defined between the slide surfaces, a slide ring carrier for the rotating slide ring, which is configured to connect the rotating slide ring to the rotating component in a rotationally fixed manner, wherein the slide ring carrier includes a sleeve region, and a force support arrangement which is configured to be mounted on a shaft and support an axial force (F) acting on the mechanical seal assembly, wherein the force support arrangement is arranged on an end face of the sleeve region of the slide ring carrier, wherein the force support arrangement includes a clamping sleeve, a conical sleeve and a split ring with at least two segments, wherein a conical connection with a first conical surface on the clamping sleeve and a second conical surface on the conical sleeve is formed between the clamping sleeve and the conical sleeve, and wherein the clamping sleeve bears against the end face of the sleeve region and the conical sleeve bears against a side surface of the split ring, wherein the slide ring carrier, the clamping sleeve, the conical sleeve and the split ring are made of metal material.

2. Mechanical seal assembly according to claim 1, wherein the clamping sleeve comprises a receiving space for receiving the conical sleeve.

3. Mechanical seal assembly according to claim 2, wherein the receiving space of the clamping sleeve comprises the first conical surface and the conical sleeve comprises the second conical surface.

4. Mechanical seal assembly according to claim 1, wherein the conical connection has an angle (α) of 35°±8° to a central axis of the mechanical seal assembly.

5. Mechanical seal assembly according to claim 1, wherein an average diameter of the split ring is larger than an inner diameter of the conical sleeve.

6. Mechanical seal assembly according to claim 1, wherein the split ring is configured to be received in a groove of the rotating component.

7. Mechanical seal assembly according to claim 1, wherein an axial gap is formed on the inner circumferential region between the clamping sleeve and the conical sleeve.

8. Mechanical seal assembly according to claim 1, wherein a screw connection is formed between the clamping sleeve and the slide ring carrier.

9. Mechanical seal assembly according to claim 1, wherein a metallic seal without elastic secondary sealing elements is formed between the slide ring carrier and the rotating slide ring.

\* \* \* \* \*